No. 658,347. Patented Sept. 25, 1900.
W. F. CROWLEY.
AUTOMOBILE AGRICULTURAL MACHINE.
(Application filed Mar. 20, 1900.)
(No Model.) 3 Sheets—Sheet 3.
Fig. 3.
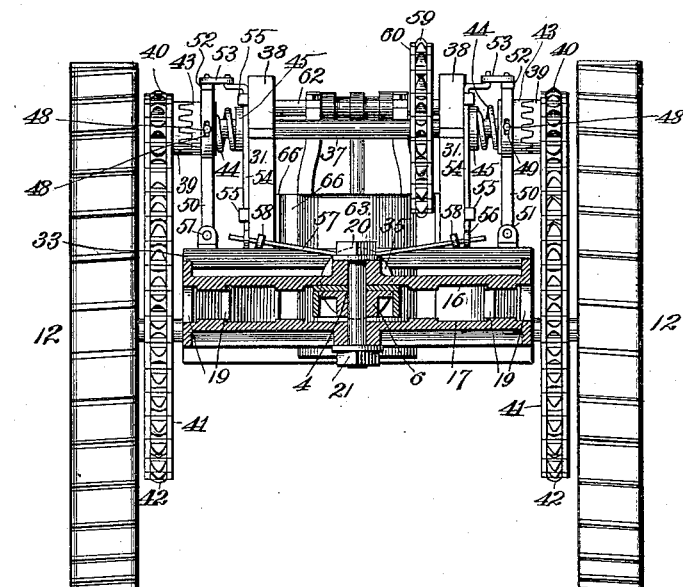
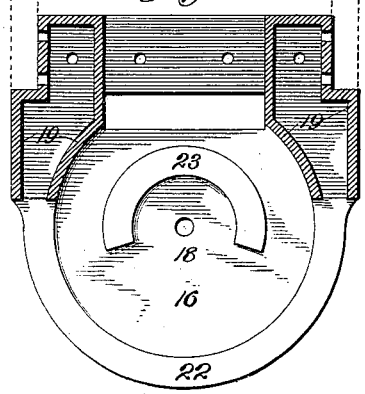
Fig. 5.
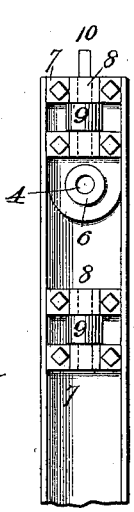
Fig. 7.
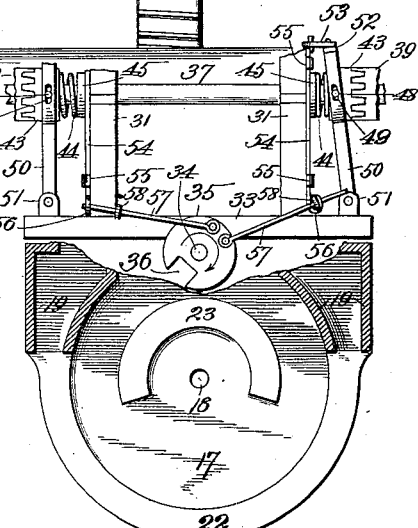
Fig. 6.
Witnesses:
H. C. Rodgers
R. E. Riley
Inventor:
Wm F. Crowley
By Fischer & Thorpe
Atty's

# UNITED STATES PATENT OFFICE.

WILLIAM FRANK CROWLEY, OF HOLLY, COLORADO.

AUTOMOBILE AGRICULTURAL MACHINE.

SPECIFICATION forming part of Letters Patent No. 658,347, dated September 25, 1900.

Application filed March 20, 1900. Serial No. 9,356. (No model.)

*To all whom it may concern:*

Be it known that I, WILLIAM FRANK CROWLEY, a citizen of the United States, residing at Holly, Prowers county, Colorado, have invented a new and useful Automobile Agricultural Machine, of which the following is a specification.

My invention relates to automobile agricultural machines; and one object is to provide a machine carrying its own propelling power and adapted to be provided with seed planting, cultivating, or harvesting appliances, and which is under such perfect control of the operator seated thereon that it may be compelled to readily follow any curvatures or irregularities in the shape or configuration of the field.

A further object is to provide a machine of this character which is of simple, strong, durable, and comparatively-inexpensive construction.

With these objects in view the invention consists in certain novel and peculiar features of construction and combinations of parts, as will be hereinafter described and claimed, and in order that it may be fully understood reference is to be had to the accompanying drawings, in which—

Figure 1:
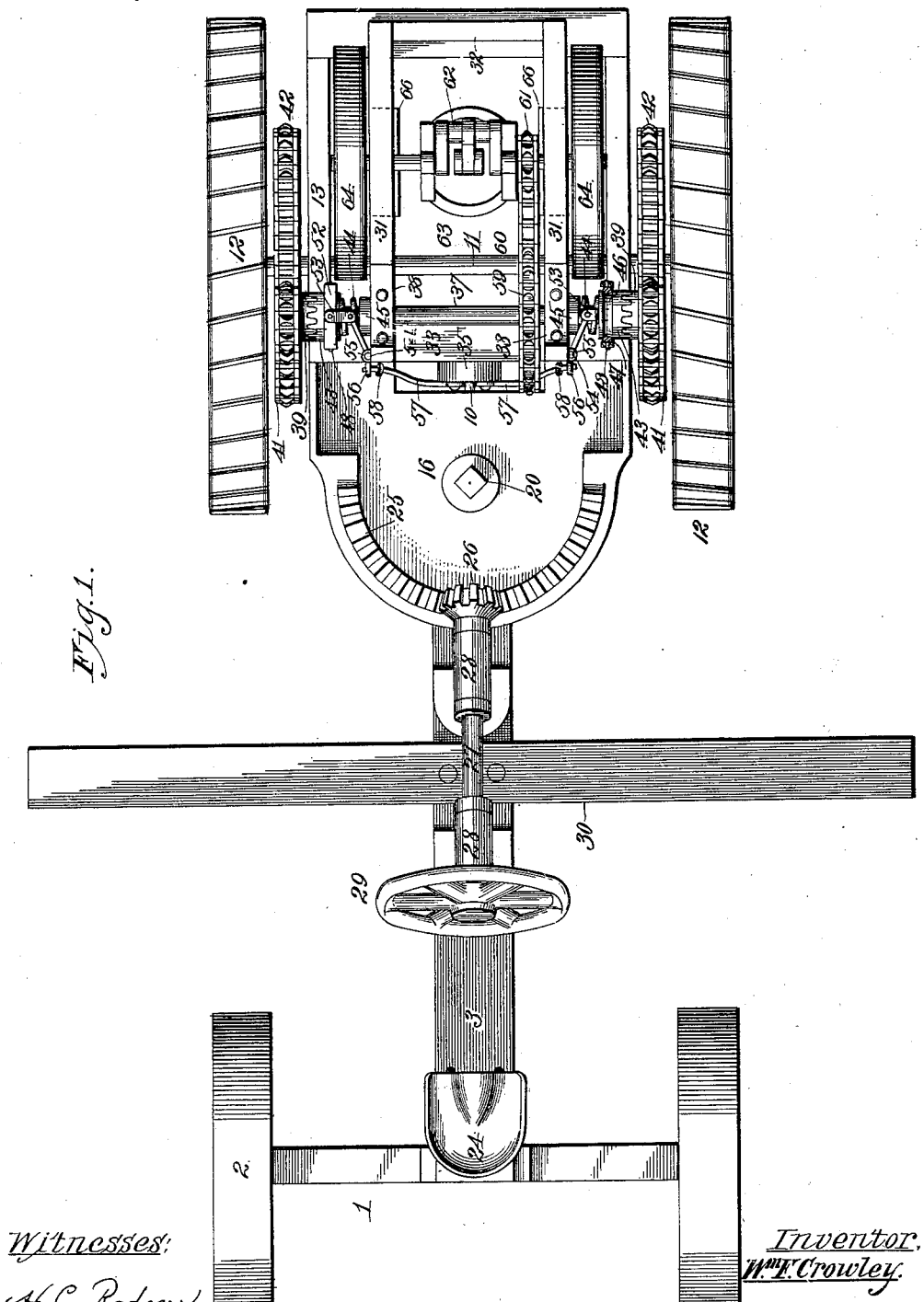
Figure 2:
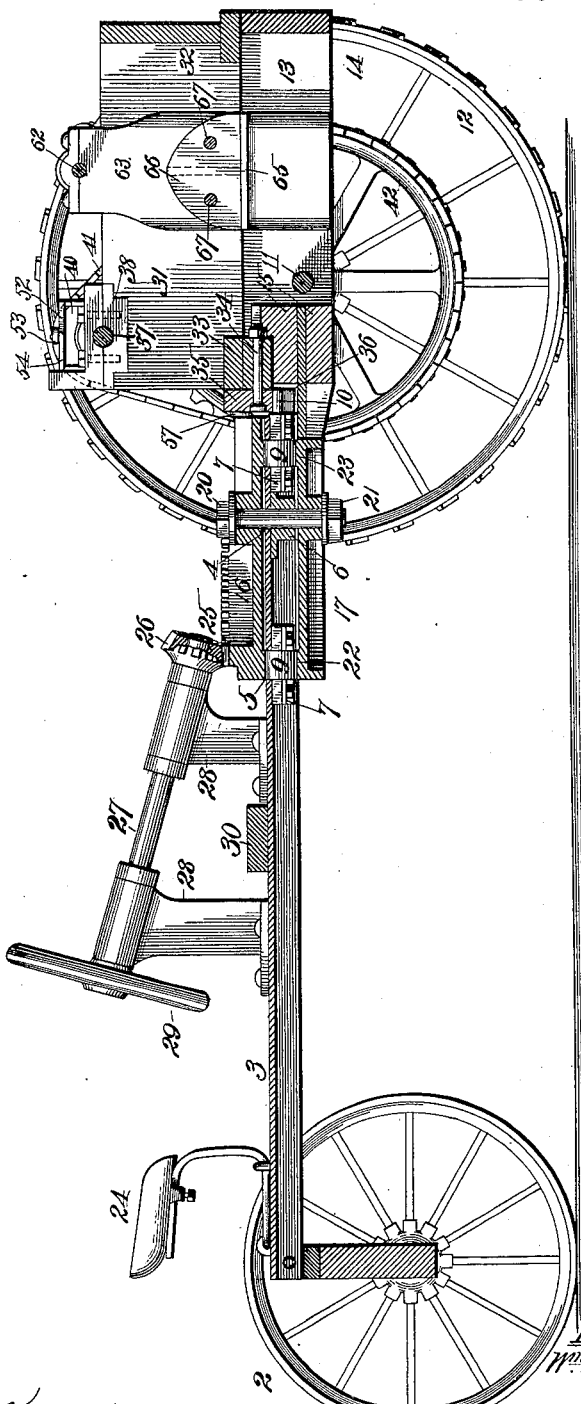

Figure 1 is a top plan view of an automobile agricultural machine embodying my invention. Fig. 2 is a vertical longitudinal section of the same. Fig. 3 is a vertical transverse section of the same. Fig. 4 is a detail view illustrating the mechanism for throwing one or the other of the carrying-wheels in or out of gear with the propelling power when guiding the machine to the right or left. Fig. 5 is a horizontal section of the turn-table and disclosing the upper half of the same in an inverted position. Fig. 6 is a similar view showing the upper side of the lower half of the turn-table. Fig. 7 is an inverted plan view of the front end of the reach-bar.

Referring to the drawings in detail, where corresponding reference-numerals designate like parts in all the figures, 1 designates the rear axle, and 2 the supporting-wheels thereof.

3 designates the reach-bar, secured at its rear end to the axle midway its length and formed, preferably, of channel-iron, and provided with a pivot-hole 4, and a pair of holes 5 at opposite sides of the pivot-hole. A bearing-sleeve 6 registers with the pivot-hole and is secured to the under side of the reach-bar to reinforce the same. A pair of bearing-boxes 7 are secured to the under side of the reach-bar at opposite sides of the openings 5, and mounted upon shafts 8, journaled in said boxes, are the roller-bearings 9 of diameter to project through the openings 5, slightly above and below the plane of the reach-bar. The foremost of said shafts is prolonged to provide a trip-pin 10 for a purpose which will hereinafter appear.

11 designates the axle of the front wheels 12. A horizontal frame mounted on said axle consists of a pair of longitudinal bars 13, a cross-bar 14 connecting their front ends and a pair of cross-bars 15 connecting their rear ends, and secured to and projecting rearwardly from said frame, as shown (see Fig. 2) or in any other suitable manner, is a turn-table comprising substantially semicircular upper and lower members 16 17, provided with holes 18, registering with the pivot-hole 4 of the reach-bar, fitting snugly between said turn-table members. Said members are connected, preferably, by the integral connecting-ribs 19 (see Figs. 5 and 6) and are pivotally secured to the reach-bar by means of the bolt 20, extending down through the registering holes 4 and 18, and engaged at its lower end by a retaining-nut 21.

The turn-table is provided with semicircular tracks 22 for continuous engagement with the rearmost roller 9 of the reach-bar and with semicircular tracks 23 for continuous engagement with the foremost roller 9, as shown clearly in Fig. 2.

In order that the operator upon seat 24 at the rear end of the reach-bar may conveniently guide the machine, the upper member of the turn-table by preference is provided with a semicircular rack 25, engaged by a bevel-pinion 26, mounted on the front end of inclined shaft 27, journaled in standards 28 upon the reach-bar, said shaft being turned in one direction or the other by means of the hand-wheel 29 upon its rear end, and mounted also upon the reach-bar at a convenient point is the transverse bar 30, from which suitable seed planting, cultivating, or harvesting appliances may be suspended; but as the particular appliances used for planting, cultivating, or harvesting have no special connection or relation to the operative parts of this machine they have been omitted.

Superposed with relation to the frame mounted upon the front axle is a second frame, comprising side bars 31, front end bar 32, and rear end bar 33, the latter carrying centrally a pin 34, upon the rear end of which is journaled a trip-wheel 35, having a peripheral notch 36 to receive the pin or prolongation of the shaft 8, carried by the reach-bar, for a purpose which will hereinafter appear. 37 designates a shaft journaled in the boxings 38, secured to said superposed frame, and journaled upon its ends are clutch members 39, provided with sprocket-wheels 40, connected by sprocket chains 41 with the large sprocket-wheels 42, secured rigidly to front wheels 12 in any suitable manner. Clutch members 43, companion to clutches 39 and adapted to slide without independent rotation upon the shaft 37, are held normally in engagement with said clutches 39 by means of springs 44, spirally encircling the shaft and bearing at their opposite ends against said sliding clutches, and plates 45, secured to said superposed frame. Clutches 43, as usual, are provided with annular grooves 46 and with bands 47, mounted therein and provided with oppositely-projecting pivot-pins 48, engaging the longitudinal slots 49 in forked levers 50, pivoted at their lower ends, as at 51, to brackets secured to the cross-bar 33 of the superposed frame. The upper ends of the forked levers are connected by cross-bars 52, linked, as at 53, to the crank-arms of shafts 54, journaled in brackets 55, secured to said superposed frame, said rock-shafts being formed with eyes or loops 56 at their lower ends, through which slidingly project the rods 57, pivoted at their inner ends to the trip-wheel 35 and provided at suitable points with the collars 58, the latter being adapted when motion is imparted to the rods by the trip-wheel to strike the looped ends of the rock-shafts and by operating the latter throw one sliding clutch member or the other out of engagement with the companion clutch, as and for a purpose hereinafter more fully explained.

Secured rigidly upon shaft 37, within the superposed frame, is a sprocket-wheel 59, connected by a chain 60 to the small sprocket-wheel 61 upon the crank-shaft 62 of a gas-engine 63. The crank-shaft of the gas-engine by preference carries a fly or balance wheel 64 at each end, and the engine is cast with flanges 65 to bear up against the under side of the superposed frame and with flanges 66 to bear against the inner side of the superposed frame and be secured thereto by bolts 67, though it is to be understood that the engine may be secured upon the machine in any suitable manner without affecting the merit of the invention, I having simply illustrated what I deem the most compact and convenient way of securing it in position. It has not been attempted, of course, to illustrate the detail construction of the engine or the necessary appurtenances for its effective operation, as these form no part of my invention.

In practice, assuming that the engine is in operation and that the machine is moving forward in a straight line, it will be understood that the parts are in the position shown most clearly in Fig. 3, with both sets of clutch members in gear, and consequently both wheels 12 tending to advance the machine. Supposing now the operator desires to turn the machine to the right, he grasps the hand-wheel 29 and turns it in the corresponding direction, so that the pin or projection 10, (see Figs. 2 and 7,) engaging the notch 36 of trip-wheel 35, will turn the latter in the direction indicated by the arrow, Fig. 4, until said pin or projection becomes disengaged therewith. At the instant the trip-wheel is turned, as explained and illustrated, one of the rods 57 is partially withdrawn through the eye or loop of its engaged rock-shaft, while the other advancing causes its collar 58 to strike the lower end of its corresponding rock-shaft and by rocking the latter swing the forked lever linked thereto to the position shown in Fig. 4, thereby withdrawing the connected clutch member from engagement with its companion clutch 39, the result of which is to throw the wheel 12 at the corresponding side out of gear with the engine and throw all the work of propelling the machine on the wheel at the left-hand side. As a consequence the right-hand wheel remains practically stationary and acts as a pivot around which the left-hand wheel turns the forward part of the machine in an obvious manner. After the operation of the trip-wheel is effected the operator may continue the manipulation of the hand-wheel if he desires to effect a comparatively-short turn; but if the turn is to be gradual he holds it stationary until the machine is started in the proper direction, and then brings the rear part back in line by reversing the operation of the hand-wheel. As this is done the pin or projection 10 reënters the notch 36 and rotates the trip-wheel back to its original position—namely, until the notch is vertically below the axis of the wheel. In the turning operation it will be obvious that the turn-table turns under the action of the pinion 26, the latter successively engaging the teeth of the rack 25. The machine may be caused to run backward, of course, by simply reversing the engine in the customary manner.

From the foregoing it will be apparent that I have produced a machine possessing the advantageous features enumerated as desirable, and while I have illustrated and described the preferred embodiment of my invention it is to be understood that I reserve the right to make such changes in the detail construction, form, arrangement, or proportion of the parts as properly fall within the spirit and scope of the appended claims.

Having thus described the invention, what

I claim as new, and desire to secure by Letters Patent, is—

1. In a machine of the character described, a wheeled frame, comprising two parts pivoted together, an engine mounted upon one part and geared to the wheels thereof, a trip-wheel mounted on the last-named part of the frame, and a pin or projection from the other part, adapted under the pivotal movement of one part to rock said trip-wheel and thereby throw one wheel or the other out of engagement with the engine, substantially as described.

2. In a machine of the character described, a wheeled frame, comprising two parts pivoted together, an engine mounted upon one part and geared to the wheels thereof, a trip-wheel mounted on the last-named part of the frame, a shaft adapted to be turned by hand mounted upon one part of the machine and geared to the other to turn the latter, a projection from the frame to rock said trip-wheel as the turning operation is in progress, and connections whereby the operation of the trip-wheel throws the engine out of gear with one of its connected wheels or the other, substantially as described.

3. In a machine of the character described, a wheeled frame comprising two parts pivoted together, one part being provided with a semicircular rack-bar concentrically with the pivotal point, a shaft on the other part adapted to be turned by hand and provided with a cog-pinion engaged by said rack, an engine mounted upon the part provided with the rack-bar and geared to the wheels of said bar, and means for throwing one or the other of said wheels out of gear with the engine, as the machine begins to turn substantially as described.

4. In a machine of the character described, a wheeled frame, comprising two parts, one provided with a turn-table having tracks, and the other with a reach-bar pivoted to said turn-table and provided with rollers for traveling on said tracks, an engine mounted upon the turn-table part and geared to the wheels thereof, and means for turning one part pivotally on the other, and for throwing the engine out of gear with one of said wheels or the other, substantially as described.

5. In a machine of the character described, a wheeled frame comprising two parts, one provided with a two-part turn-table having tracks, and the other with a reach-bar pivoted to and between the parts of the turn-table, and provided with rollers engaging the tracks thereon, an engine mounted upon the turn-table part and geared to the wheels thereof, and means for turning one part pivotally on the other, and for throwing the engine out of gear with one of said wheels or the other, substantially as described.

6. In a machine of the character described, a wheeled frame, comprising two parts pivoted together, one having a notched trip-wheel, and the other a pin to engage said notch and trip the wheel as the machine begins to turn, an engine mounted upon one part, a shaft journaled upon the same part and geared thereto, clutch members journaled upon said shaft and geared to the wheels of said part, spring-actuated clutch members keyed to slide but not rotate on said shaft and engaging the first-named clutch members, levers engaging said slidable clutch members, and instrumentalities between the trip-wheel and said levers whereby the operation of said wheel will cause one of said levers to withdraw the connected slidable clutch members from engagement with the companion clutch members, substantially as described.

7. In a machine of the character described, a wheeled frame, comprising two parts pivoted together, one having a notched trip-wheel, and the other a pin to engage the notch of and trip said wheel as the machine begins to turn, an engine mounted upon one part, a shaft journaled upon the same part and geared to the engine, clutch members journaled upon said shaft and geared to the wheels of said part, spring-actuated clutch members keyed to slide but not rotate on said shaft and engaging the first-named clutch members, levers engaging said slidable clutch members, rock-shafts linked to said members, and rods pivotally connected to the trip-wheel and having a sliding connection with said rock-shafts, and provided with collars adapted in the outward movement of said rods to rock said rock-shafts, substantially as described.

In testimony whereof I affix my signature in the presence of two witnesses.

WILLIAM FRANK CROWLEY.

Witnesses:
HENRY L. JOHNSON,
J. B. HARDEN.